United States Patent
Kim

(10) Patent No.: US 7,602,685 B2
(45) Date of Patent: Oct. 13, 2009

(54) METHOD OF AND APPARATUS FOR RECORDING DATA ON A MINIMALLY BLANKED OPTICAL DISC IN AN INCREMENTAL RECORDING MODE AND COMPUTER READABLE STORAGE MEDIUM ENCODED WITH PROCESSING INSTRUCTIONS PERFORMING THE METHOD

(75) Inventor: Hyung-kyoon Kim, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 536 days.

(21) Appl. No.: 10/779,819

(22) Filed: Feb. 18, 2004

(65) Prior Publication Data

US 2005/0058035 A1 Mar. 17, 2005

(30) Foreign Application Priority Data

Feb. 18, 2003 (KR) .................. 10-2003-0010042

(51) Int. Cl.
G11B 7/00 (2006.01)
(52) U.S. Cl. .................. 369/53.24; 369/53.12
(58) Field of Classification Search .......... 369/53.24, 369/53.12
See application file for complete search history.

(56) References Cited

U.S. PATENT DOCUMENTS 6,876,615 B2* 4/2005 Shishido ............ 369/53.24
7,082,089 B2* 7/2006 Shishido ............ 369/53.24
7,085,214 B2* 8/2006 Shishido ............ 369/53.24
7,106,665 B2* 9/2006 Lee ................... 369/30.07
7,114,028 B1* 9/2006 Green et al. ............ 711/111
7,120,735 B1* 10/2006 Summers et al. ........ 711/111
2004/0130992 A1* 7/2004 Idobuchi ............ 369/53.37

FOREIGN PATENT DOCUMENTS

| JP | 10-320925 | | 12/1998 |
| JP | 2000030369 A | * | 1/2000 |
| JP | 2002183974 A | * | 6/2002 |
| KR | 2002-0006572 | | 1/2002 |
| KR | 2002-24763 | | 4/2002 |

* cited by examiner

*Primary Examiner*—Wayne R Young
*Assistant Examiner*—LaTanya Bibbins
(74) *Attorney, Agent, or Firm*—Staas & Halsey LLP

(57) ABSTRACT

A method of recording data on an optical disc in an Incremental Recording mode in which data is partially recordable. The method includes the steps of determining whether the optical disc is formatted and recording data on the optical disc upon determining that the optical disc is not formatted; checking a state of the optical disc in a recording management area in which disc information is recorded; and erasing, after the checking step, data ranging from a next writable address to a predetermined block upon determining that the optical disc is a Minimal Blank disc in which data is erased from the recording management area to a lead-in area.

8 Claims, 2 Drawing Sheets

METHOD OF AND APPARATUS FOR RECORDING DATA ON A MINIMALLY BLANKED OPTICAL DISC IN AN INCREMENTAL RECORDING MODE AND COMPUTER READABLE STORAGE MEDIUM ENCODED WITH PROCESSING INSTRUCTIONS PERFORMING THE METHOD

CROSS-REFERENCE TO RELATED APPLICATIONS

This application claims the priority of Korean Patent Application No. 2003-10042, filed on Feb. 18, 2003, in the Korean Intellectual Property Office, the disclosure of which is incorporated herein in its entirety by reference.

BACKGROUND OF THE INVENTION

1. Field of the Invention

The present invention relates to methods of recording data on an optical disc, and more particularly, to a method of and apparatus for recording data on a Minimal Blank optical disc in an Incremental Recording mode and a computer readable storage medium encoded with processing instructions for performing the method.

2. Description of the Related Art

Recording modes of a DVD-RW optical disc are divided into three modes: a Blank (Erase) mode; a Format mode; and a Write mode. The Blank (Erase) mode is used to erase data recorded on a disc or to initialize a disc. Further, the Blank (Erase) mode is generally divided into a Full Blank (Full Erase) mode and a Minimal Blank (Quick Erase) mode. The Full Blank mode is used to erase data ranging from a recording management area (RMA) of the optical disc to the end of the optical disc. The Minimal Blank mode is used to erase data ranging from the RMA of the optical disc to a lead-in area. The Format mode is not dependent on recording tools and allows Overwrite and Read/Write operations to be freely carried out. The Write mode is a general operating mode used to record data on an optical disc. The Write mode is divided into a Sequential mode and a Restricted Overwrite mode. The Sequential mode is further divided into an Incremental Recording mode and a Disc At Once (DAO)-Recording mode. The Incremental Recording mode is used to partially record data on an optical disc, and the DAO write mode is used to fully record data for the purpose of writing on entire optical disc.

The Sequential Recording mode is used when data is recorded on a disc which is not formatted, whereas the Restricted Overwrite mode is used when data is recorded on an optical disc which is formatted. A new or fully blanked disc can be used in the Incremental Recording mode of the Sequential mode. Meanwhile, a disc which is minimally blanked cannot be used in the Incremental Recording mode but can be used in the DAO recording mode.

These data recording strategies are disclosed in U.S. Pat. No. 6,483,799.

FIG. 1 is a flowchart illustrating the operation of recording data in a conventional Incremental Recording mode. It is determined whether or not an optical disc is formatted in operation 100. Upon determining, in operation 100, that the optical disc is not formatted, it is determined whether the optical disc is fully blanked in operation 101. Upon determining, in operation 101, that the optical disc is fully blanked, data can be recorded on the optical disc in operation 102. However, if it is determined, in operation 100, that the optical disc is formatted, or, in operation 101, that the disc is not fully blanked, a recording error is displayed in operation 103.

That is to say, to use the Incremental Recording mode which can partially record/store data, a new (not previously used) optical disc should be used or an optical disc on which data has been recorded once or more should be fully blanked by completely erasing the data therefrom. In case of a DVD-RW 4.7 GB, it takes about 2 minutes to perform a Minimal Blank operation but about 1 hour to perform a Full Blank operation (based on DVD-RW at 1×). In other words, to use the Incremental Recording mode, one must either use a new optical disc or, in the case of a previously recorded disc, perform a Full Blank operation which requires about 1 hour to carry out. Thus, while a DVD-RW optical disc has a significant advantage in that users can easily divide and erase borders, such a time requirement inconveniences users.

SUMMARY OF THE INVENTION

The present invention provides a method for recording data on a Minimal Blank optical disc, in which data ranging from an RMA to a lead-in area is erased, using an Incremental Recording mode which partially records/stores data.

Additional aspects and advantages of the invention will be set forth in part in the description which follows and, in part, will be obvious from the description, or may be learned by practice of the invention.

According to an aspect of the present invention, there is provided a method of recording data on an optical disc in an Incremental Recording mode in which data can be partially recorded, the method includes: (a) determining whether or not the optical disc is formatted and recording data on the optical disc upon determining that the optical disc is not formatted; (b) checking a state of the optical disc in a recording management area in which disc information is recorded; and (c) erasing data ranging from a next writable address to a predetermined block upon determining that the optical disc is a Minimal Blank disc in which data is erased from the recording management area to a lead-in area.

The determining may also include outputting a recording error message upon determining that the optical disc is formatted.

The erasing may also include recording data from a next address upon determining that the optical disc is a Minimal Blank disc in which data is erased from the recording management area to a lead-out area after checking the state of the optical disc.

According to another aspect of the present invention, there is provided a computer readable storage medium encoded with processing instructions for performing a method of recording data on an optical disc in an Incremental Recording Mode in which data can be partially recorded, the method including: determining whether or not the optical disc is formatted and recording data on the optical disc upon determining that the optical disc is not formatted; checking a state of the optical disc in a recording management area in which disc information is recorded; and erasing, after the checking operation, data ranging from a next writable address to a predetermined block upon determining that the optical disc is a Minimal Blank disc in which data is erased from the recording management area to a lead-in area.

According to still another aspect of the present invention, there is provided a method of recording data on an optical disc in an Incremental Recording mode. The method includes the operations of: determining whether the optical disc is formatted; partially recording data to the optical disc at a desired position upon determining that the optical disc is not formatted; checking whether the optical disc is Fully Blanked or Minimally Blanked after the partial recording operation; erasing, after the checking operation, data from a portion of the optical disc that may lead to a recording or read out error upon determining in the checking operation that the optical disc is Minimally Blanked; and recording the remaining data at the desired address on the optical disc after the erasing operation.

According to yet another aspect of the present invention, there is provided an apparatus for recording data on a Minimally Blanked optical disc in an Incremental Recording mode. The apparatus includes a data eraser/recorder and a controller. The data eraser/recorder, in response to a signal, records first data to a desired portion of the optical disc or erases data from a portion of the optical disc that may lead to a recording or read out error. The controller determines whether the optical disc is formatted or unformatted, outputs a signal to the data eraser/recorder to partially record the first data to the optical disc upon determining that the optical disc is not formatted, determines whether the optical disc is fully blanked or minimally blanked after the data eraser/recorder partially records data to the optical disc, outputs a signal to the data eraser/recorder to erase second data from a portion of the optical disc that may lead to a recording or read out error upon determining that the disc is minimally blanked, and outputs a signal to the data eraser/recorder to record a remaining portion of the first data if upon determining that the disc is fully blanked or if after the second data is erased.

BRIEF DESCRIPTION OF THE DRAWINGS

These and/or other aspects and advantages of the invention will become apparent and more readily appreciated from the following description of the preferred embodiment taken in conjunction with the accompanying drawings in which.

DETAILED DESCRIPTION OF A PREFERRED EMBODIMENT

Figure 1:
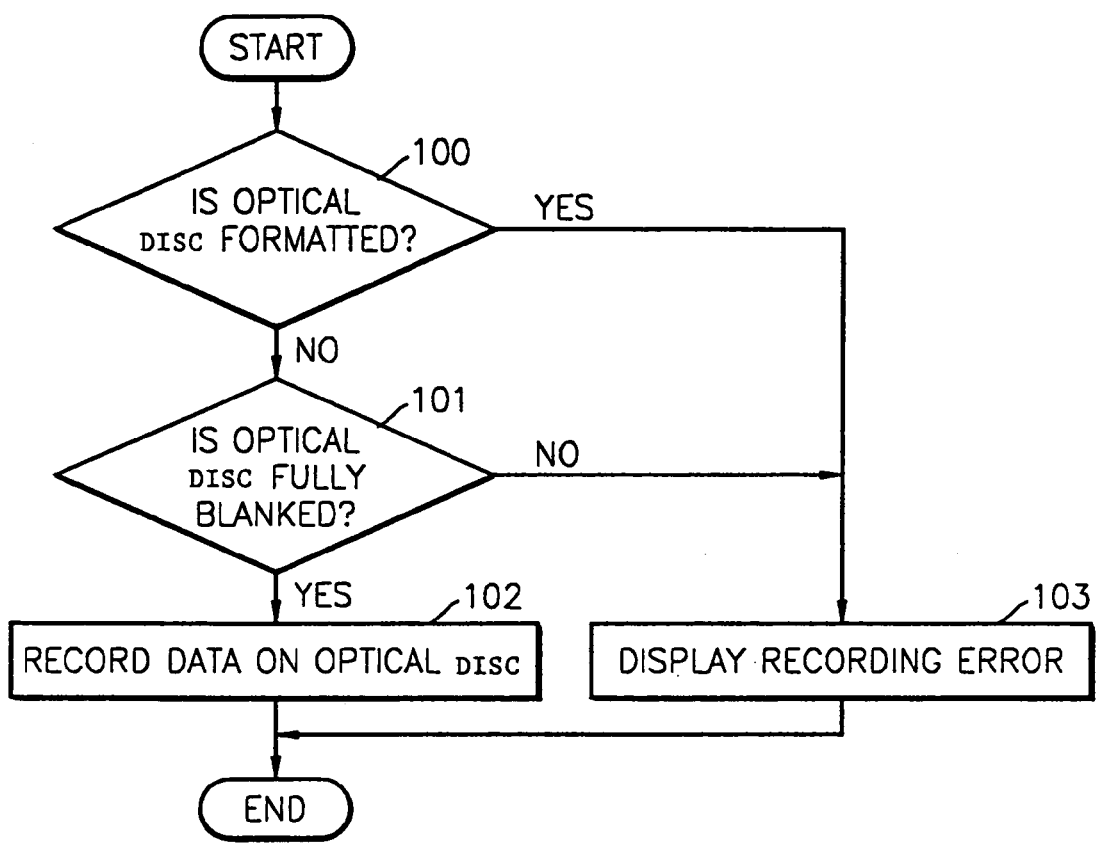
FIG. 1 is a flowchart illustrating the operation of recording data in a conventional Incremental Recording mode.

Reference will now be made in detail to the present preferred embodiment of the present invention, examples of which are illustrated in the accompanying drawings, wherein like reference numerals refer to the like elements throughout. The embodiment is described below in order to explain the present invention by referring to the figures.

Figure 2:
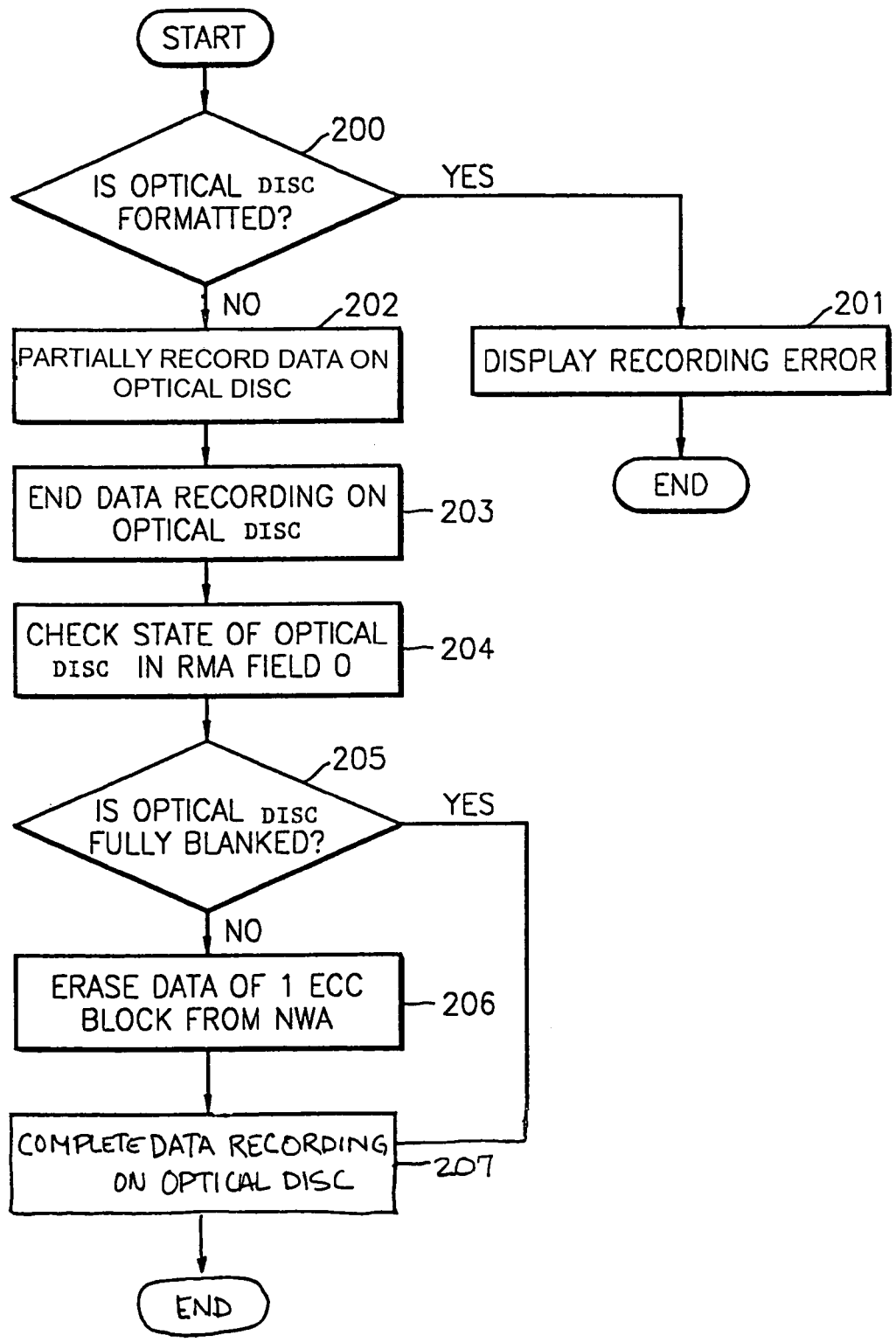
FIG. 2 is a flowchart illustrating the operation of recording data according to an embodiment of the present invention.

FIG. 2 is a flowchart illustrating the operation of recording data according to one embodiment of the present invention. The method includes the operations of determining whether or not an optical disc is formatted in operation 200, displaying a recording error in operation 201 upon determining that the optical disc is formatted, partially recording data on the disc in operation 202 upon determining that the optical disc is not formatted, ending the data recording on the optical disc in operation 203, checking the state of the optical disc at Field 0 of a recording management area (RMA) in operation 204, determining whether or not the optical disc is fully blanked in operation 205, erasing 1 ECC block from a next writable address (NWA) in operation 206 upon determining that the optical disc is not fully blanked, and completing data recording on the optical disc is operation 207.

The present invention will be explained in detail with reference to FIG. 2.

To use an Incremental Recording mode in which data can be partially recorded/stored, a new (not previously used) optical disc should be used or an optical disc on which data has been recorded once or more should be fully blanked by completely erasing the data therefrom.

Although the reasons why the Incremental Recording cannot be performed on an optical disc which is minimally blanked have not presented in the prior art, two main causes are generally acknowledged. First, when next data is recorded on an optical disc in an Incremental Recording mode, the next data may be confused with data previously recorded in a border area during a seeking operation of a next writable address. Second, when the next data is recorded on an optical disc in the Incremental Recording mode, a recording area and a border area may coincide or overlap with each other. These two reasons have prevented the Incremental Recording mode from being carried out on a Minimal Blank optical disc.

Advantageously, the present inventor has developed a method by which data can be successfully recorded to a Minimally Blanked optical disc using an Incremental Recording mode.

A data recording method is programmed and stored in a memory (not shown). A controller (not shown) accesses a program of the memory to start data recording.

When a Sequential Recording mode, which is used to record data on a non-formatted disc, is used, the controller determines whether or not the currently loaded optical disc is formatted in operation 200.

Upon determining, in operation 200, that the currently loaded optical disc is formatted, the controller either displays or causes to be displayed a recording error indication in operation 201.

If it is determined, in operation 200, that the currently loaded optical disc is not formatted, data is partially recorded irrespective of whether or not the optical disc is blanked in operation 202.

When the partial data recording at a desired position is completed, the data recording on the optical disc is ended in operation 203 and the state of the optical disc is checked, that is, whether or not the optical disc is blanked at RMA Field 0 in operation 204. The area of a DVD optical disc is divided into three areas: a mechanical clamping area; a recording information area including a Power Calibration area used to find an appropriate recording power and a Recording Management area used to store disc information; and an information area including a lead-in area on which substantial data is recorded, a data recording area and a lead-out area. Among these areas, the information on the state of the disc, namely, the information on whether or not the optical disc is blanked, is stored in Field 0 of RMA.

It is determined whether or not the value stored at Field 0 of the RMA indicates that the optical disc is in a Fully Blanked state in operation 205. When a value '04' is designated at the Field 0 of RMA, the optical disc is indicated to be a Minimal Blank optical disc. After checking the Field 0 of RMA, if it is determined that the optical disc is fully blanked, data is recorded up to a desired position.

However, if the '04' is designated at the Field 0 of RMA and thus the optical disc is determined to be in a Minimal Blank state, the controller erases data of 1 error correction code (ECC) block (16 sectors) from a next writable address in operation 206.

The reason the data corresponding to 1 ECC block is erased from the next writable address is to prevent the data confusion and the coincidence (overlapping) of a recording area and a border area, as previously explained. That is to say, the reason is to smoothly perform the Incremental Recording mode even on the optical disc that is in the Minimal Blank state. When data confusion or a recording area and a border area overlap, recording and read out errors tend to occur.

After the data of 1 ECC block is erased from the next writable address, the remaining data is recorded up to the desired position in operation 207. In other words, the data not recorded in operation 202 is recorded so that all of the data is recorded onto the disc.

As described above, the Incremental Recording mode can be applied to a Minimal Blank optical disc, thereby providing convenience to users and enabling data to be sequentially managed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording data on an optical disc in an Incremental Recording mode in which data is partially recordable, the method comprising:
   determining whether the optical disc is formatted and recording data on the optical disc upon determining that the optical disc is not formatted;
   checking a state of the optical disc in a recording management area in which disc information is recorded, the checking including checking a recording management area to determine whether the disc is Fully Blanked or Minimally Blanked, the disc indicating to be Minimally Blanked when a value '04' is designated at a field 0 of the recording management area, the disc indicating to be Fully Blanked when a value '04' is not designated at the field of 0 of the recording management area;
   erasing, after the checking and after recording the data, data ranging from a next writable address to a predetermined block upon determining that the optical disc is the Minimally Blanked disc in which data is erased from the recording management area to a lead-in area; and
   recording a remainder of the data other than the recorded data, after the erasing.

2. The method of claim 1, wherein the determining further comprises outputting a recording error message upon determining that the optical disc is formatted.

3. The method of claim 1, wherein the erasing comprises recording, after the checking of the state, data from a next address upon determining that the optical disc is a Minimal Blank disc in which data is erased from the recording management area to a lead-out area.

4. A computer readable medium encoded with processing instructions for implementing a method of recording data on an optical disc in an Incremental Recording mode in which data can be partially recorded, the method comprising:
   determining whether or not the optical disc is formatted and recording data on the optical disc upon determining that the optical disc is not formatted;
   checking a state of the optical disc in a recording management area in which disc information is recorded, the checking including checking a recording management area to determine whether the disc is Fully Blanked or Minimally Blanked, the disc indicating to be Minimally Blanked when a value '04' is designated at a field 0 of the recording management area, the disc indicating to be Fully Blanked when a value '04' is not designated at the field 0 of the recording management area;
   erasing, after the checking and after recording the data, data ranging from a next writable address to a predetermined block upon determining that the optical disc is the Minimally Blanked disc in which data is erased from the recording management area to a lead-in area; and
   recording a remainder of the data other than the recorded data, after the erasing.

5. A method of recording data on an optical disc in an Incremental Recording mode, the method comprising:
   determining whether the optical disc is formatted;
   recording data to the optical disc at a desired position upon determining that the optical disc is not formatted;
   checking a recording management area to determine whether the optical disc is Fully Blanked or Minimally Blanked after the recording, the disc indicating to be Minimally Blanked when a value '04' is designated at a field 0 of the recording management area, the disc indicating to be Fully Blanked when a value '04' is not designated at the field 0 of the recording management area;
   erasing, after the checking, data from a portion of the optical disc that may lead to a recording or read out error upon determining that the optical disc is Minimally Blanked; and
   recording remaining data other than the recorded data at the desired position on the optical disc after the erasing.

6. The method of claim 5, wherein data ranging from a next writable address to a predetermined block is erased in said erasing.

7. The method of claim 5, further comprising outputting an error message upon determining that the optical disc is formatted.

8. The method of claim 5, further comprising recording, after the checking, data from a next address upon determining that the optical disc is Minimally Blanked.

* * * * *

UNITED STATES PATENT AND TRADEMARK OFFICE
CERTIFICATE OF CORRECTION

PATENT NO. : 7,602,685 B2  Page 1 of 1
APPLICATION NO. : 10/779819
DATED : October 13, 2009
INVENTOR(S) : Hyung-kyoon Kim It is certified that error appears in the above-identified patent and that said Letters Patent is hereby corrected as shown below:

Title Page, Column 1 (Title), Line 7, change "INSTRUCTIONS PERFORMING" to --INSTRUCTIONS FOR PERFORMING--.

Column 1, Line 7, change "INSTRUCTIONS PERFORMING" to --INSTRUCTIONS FOR PERFORMING--.

Signed and Sealed this

Fifth Day of January, 2010

David J. Kappos
*Director of the United States Patent and Trademark Office*